United States Patent [19]
Heacock et al.

[11] Patent Number: 5,295,761
[45] Date of Patent: Mar. 22, 1994

[54] METHOD FOR REMEDIATING CONTAMINATED SOIL

[76] Inventors: Gary E. Heacock, 1773 Wells Branch Pkwy., #606, Austin, Tex. 78728; Kenneth G. Grandstaff, 26 McDermott Ct., Allendale, N.J. 07401; Michela Owens, 6900 Mesa Dr., Austin, Tex. 78731

[21] Appl. No.: 36,869

[22] Filed: Mar. 25, 1993

[51] Int. Cl.$^5$ ................................................. B09B 3/00
[52] U.S. Cl. ..................................... 405/128; 405/129; 405/263; 588/252
[58] Field of Search ............... 405/128, 129, 258, 263; 588/249, 251, 252, 257

[56] References Cited

U.S. PATENT DOCUMENTS

| | | | |
|---|---|---|---|
| 4,687,373 | 8/1987 | Falk et al. | 405/128 X |
| 4,859,367 | 8/1989 | Davidovits | 405/128 X |
| 4,927,293 | 5/1990 | Campbell | 405/128 |
| 5,035,537 | 7/1991 | Rose | 405/128 X |
| 5,039,415 | 8/1991 | Smith | 405/128 X |
| 5,184,917 | 2/1993 | Rez | 405/128 |

*Primary Examiner*—David H. Corbin
*Attorney, Agent, or Firm*—Richard C. Litman

[57] ABSTRACT

A method for the remediation of soils contaminated with hydrocarbons utilizing a selective liquid additive. The method includes the steps of collecting the contaminated soil; reducing the collected soil to finely-divided particles: applying a controlled amount of the selective liquid additive as a spray onto the contaminated soil particles; and aerating the soil particles as the additive is being applied. After treatment, the decontaminated soil is rendered environmentally safe.

6 Claims, No Drawings

METHOD FOR REMEDIATING CONTAMINATED SOIL

BACKGROUND OF THE INVENTION

1. Field of the Invention

The present invention relates generally to an improved method for remediating contaminated materials. More particularly, the invention pertains to a continuous treatment procedure for the efficient remediation of soils contaminated with hydrocarbons, whereby the treated soils are rendered environmentally safe for use.

2. Description of the Prior Art

Soil contamination caused by the accidental discharge of hydrocarbons is known to have detrimental as well as long-lasting effects on the environment. This type of environmental pollution may result from spillage of fuels into the ground at gasoline service stations from rusted storage tanks or from leakage into earth formations at or near oil wells. Also, spillage of crude oil into the ocean from tankers and offshore facilities can wash ashore to contaminate beaches, shore lines and similar areas. While the problem of hydrocarbon soil contamination remains a continuing one, efforts are underway to cleanup abandoned sites where such contamination has occurred in the past in order to make the areas environmentally suitable for use.

One such cleanup operation involves simply hauling the hydrocarbon contaminated soil to a hazardous landfill site where it can be perpetually isolated from the environment. However, problems with this procedure stem largely from the fact that it is economically expensive and increasingly imposes a limitation on available landfill sites. Moreover, the U.S. Environmental Protection Agency (EPA), charged with the responsibility for implementing and supervising hazardous waste programs, recently promulgated a series of regulations which require that certain wastes containing specified hazardous materials may no longer be deposited in landfills without pretreatment. Government regulations additionally require that soils having a high content of petroleum hydrocarbons, for example, must have environmentally acceptable toxicity levels and exhibit a non-flowing consistency before they can be discarded in a landfill. The end result of these governmental requirements is that hydrocarbon contaminated soils must be subjected to stabilization, detoxification, solidification, or some variation and/or combination thereof, prior to ultimate disposal or reuse.

Various methods for the remediation or treatment of contaminated materials have been proposed in the patent literature. For example, U.S. Pat. No. 4,927,293 to Campbell describes a mechanized remedial method which includes spraying a liquid oxidizing agent, such as hydrogen peroxide, on a mixture containing a calcined absorbent and contaminated material, and then aerating the treated mixture. However, this method is disclosed to result in volatile reaction by-products which must be collected to prevent their release into the atmosphere. Another such procedure includes spraying hydrocarbon contaminated soil with a microbe-containing aqueous solution as set forth in U.S. Pat. No. 5,039,415 to Smith. Again, this prior art procedure releases unacceptable quantities of $CO_2$ into the atmosphere and is very time-consuming, requiring several days to complete all the steps of the cleanup operation.

U.S. Pat. No. 5,035,537 to Rose discloses a method of treating soil contaminated by hydrocarbon compounds which includes the steps of uniformly dispersing contaminated soil on a surface and applying an emulsifying agent to volatilize the hydrocarbons in the soil. This patent further describes an impervious tent positioned over the treatment area where the volatilized materials are collected and incinerated in order to comply with governmental statues and codes.

U.S. Pat. No. 5,184,917 to Rez teaches a decontamination method wherein petroleum polluted soil is introduced into a cementitious paste to form a shaped concrete mix. The shaped mix is then cured so as to encapsulate the hydrocarbon pollutants in the cured concrete mix and thereby reduce the risk of environmental contamination.

From the foregoing, it is apparent that a need exists for a safe and efficient cleanup method for treating and handling hydrocarbon contaminated soil so that no environmentally unacceptable reaction by-products are released and the treated soil will meet governmental regulations and standards.

SUMMARY OF THE INVENTION

It is accordingly among the primary objects of the present invention to provide an efficient soil remediation method, whereby soil contaminants are effectively stabilized by a controlled amount of a selective additive such that the treated soil will meet or exceed governmental standards for environmental safety.

Another object of the present invention is to provide a remedial method for detoxifying hydrocarbon contaminated soil so that volatile toxic materials are quickly neutralized to prevent their release into the atmosphere.

These and other objects are accomplished in accordance with the present invention which provides a continuous procedure for remediating soils contaminated by pollutants such as petroleum and liquid hydrocarbons comprising the operative steps of: (a) collecting the contaminated soil; (b) reducing the collected soil to finely-divided particles; (c) applying a controlled amount of a selective liquid additive as a spray onto the contaminated soil particles; and (d) aerating the soil particles as the additive is being applied so as to produce a sand-like product which can be safely discharged into the environment. The selective additive consists essentially of an aqueous solution of sodium silicate, ethylene glycol and sodium methyl silanolate. This liquid additive begins working immediately upon application by penetrating each particle of contaminated soil to chemically alter the composition of the hydrocarbon contaminants and inhibit the volatilization of toxic components into the atmosphere. The additive-contaminant reaction products solidify during the aeration step of the present method and thereby permanently stabilizes the treated particles so that leeching of toxic substances is prevented from encroaching on the surrounding environment.

The proportion or ratio between the contaminated soil and the additive employed in the method of the present invention generally varies depending upon the level of contamination in the soil, the type of soil, and the degree of decontamination levels desired. In a preferred embodiment of the present invention, the application rate of the selective liquid additive may be efficiently controlled by continuously monitoring the pH value of the soil during the course of the treatment. Adjustments to the application rate of the additive may be made throughout the procedure to achieve an optimum pH for the treated soil of about 7, wherein hydrocarbon concentrations in the soil are effectively neutralized.

The resultant treated soil meets government environmental standards for safety and, therefore, may be replaced in the void from which it was initially removed, transported to another excavation site, or used as clean, uncontaminated dirt for any desired purpose.

The above description, as well as further objects, features and advantages of the present invention, will be more fully appreciated by reference to the following detailed description.

DETAILED DESCRIPTION OF THE INVENTION

The cleanup procedure of the present invention is particularly adapted for the decontamination or detoxification of soil, porous rock and similar earth substances known to contain toxic amounts of petroleum hydrocarbons, such as fuel, diesel oil and the like. The present operation may be performed either on-site or any convenient location away from the contaminated area, but initially involves the step of collecting or removing the hydrocarbon polluted soil. The contaminated soil may be removed from a large site by any suitable excavating machine or heavy earth moving equipment. In the case of a relatively small site, the contaminated soil may be collected manually using digging implements such as a shovel.

The collected soil is then reduced to a finely-divided particulate state utilizing conventional machinery such as a soil shredder or hammer mill. Preferably, the soil is reduced to an average particle size of less than about an ¼ inch in cross-sectional diameter. The particles of contaminated soil may be discharged from the shredder or hammer mill in a continuous flow path before falling to the ground. Upon exiting the reduction machinery, the flow of particles is sprayed with the selective additive solution, while being aerated.

It is preferred that the liquid additive be continuously applied by a mechanized spray system which will ensure sufficient and uniform dispersal of the spray additive throughout the contaminated soil particles. It is preferred that the spray system include a plurality of spray nozzles directed at the particle flow path from various angles as it exits the hammer mill, for example. The multi-directed spray nozzles may be conveniently positioned near the outlet section of the reduction machinery and completely surround the exiting particle flow, for instance. Alternately, the spray nozzles can be linearly spaced alone the path of the particle flow. In any event, the series of nozzles create a spray pattern that allows the additive to penetrate the contaminated soil particles from all directions simultaneously. The liquid additive is expediently supplied to the spray nozzles under pressure by means of a conduit connected to a pressurized container of additive. The pressurized container is equipped with means for regulating the additive application rate during the course of the present procedure.

Air is continuously injected under pressure into the particle flow to aid in the intimate contact of the additive with contaminants, and to facilitate the drying of the treated soil particles. This aeration step of the present invention may be accomplished by a plurality of air nozzles angularly directed and positioned in a manner similar to the arrangement of the spray nozzles described hereinabove. A supply of compressed air is suitably connected to the air nozzles and may include air regulating means to control the degree of particle turbulence and direction of flow of the soil particles.

With respect to the additive, it is significant to note that other known remediation agents when subjected to the method of the present invention did not give the same beneficial results as those demonstrated by the present selective product. On the same note, it was found that application of the present additive utilizing other prior art remedial procedures did not result in TPH (Total Petroleum Hydrocarbon) reduction levels which meet EPA standards. The selective additive employed in the present invention consists essentially of an aqueous solution of about 50-70% by weight of sodium silicate, and less than 2% by weight of ethylene glycol and sodium methyl silanolate. This commercially available product is non-toxic, non-flammable and odorless, and may be purchased under the product name "TSW" from Relco, Inc. of Texarkana, Ark.

The underlying explanation for the overall effectiveness of the selective additive in the present method is not completely understood since the chemical interactions between this alkali metal silicate based material and hydrocarbon contaminants are extremely complex, involving various reactions which may occur simultaneously. However, it has been observed that the liquid additive begins working immediately upon application by penetrating each particle of contaminated soil. It is believed that the present additive breaks down the chemical composition of the hydrocarbon contaminants to inhibit the volatilization of any toxic components into the atmosphere. The additive-contaminant reaction products undergo detoxification and solidification during the aeration step of the present method to permanently stabilize the treated particles against future leeching of any toxic substances into the surrounding environment.

It should be understood that the suggested interpretation for the unexpected effectiveness of the present invention is merely proposed as a theoretical guide. It is not intended that the present invention be limited to any particular theory or mechanism involving interrelated chemical systems.

An important feature of the present invention is the capability of controlling the application rate of the selective liquid additive to prevent costly waste of the silicate additive and obtain decontaminated soil products which meet or exceed EPA standards. This aspect of the invention may be accomplished by continuously sampling the soil during the course of the treatment to determine the pH of the untreated as well as treated soil. Once the pH of the samples is determined, the application rate of the additive and/or particle flow rate may be adjusted to achieve the desired neutralized soil product.

For purposes of the present invention, the ratio between the contaminated soil and the application rate of the selective additive primarily varies depending upon the pH value of the soil taken periodically during the course of the present procedure. The flow rate of additive spray can be adjusted as needed during the present treatment method based on the ongoing sampling of hydrocarbon contaminate level readings as a measure of the pH. This adjustment procedure in combination with the step of reducing the soil from clods to particulate size are critical to the present method in permitting the utilization of the least effective amount of additive to achieve the highest levels of decontamination. Typically, the application rate ranges from about 1 to about 8 gallons of additive per cubic yard of contaminated soil.

Upon completion of the present treatment procedure, contaminants are reduced to levels of over 90% to produce a dirt-like material which is completely neutralized. The resultant treated soil meets government environmental standards for safety and may be returned to the initial excavation area, transported to a landfill site, used in road construction, or for any use desired.

The following specific example is given to further illustrate the present invention. All relative proportions are set forth as parts by weight unless otherwise specifically indicated.

EXAMPLE

Approximately 1,200 cubic yards of contaminated clay based soil was stock piled at a site located in Austin, Tex. and treated in accordance with the present invention as described hereinabove. About 1,000 cubic yards of the soil was contaminated with diesel and unleaded gasoline fuels resulting from leaking pipes and underground fuel storage tanks at a nearby service station. The stock pile also contained about 200 cubic yards of soil polluted with fuels and unknown metallic contaminants resulting from vehicle accidents and other highway projects which were transported to the treatment site. The product "TSW" (available from Relco, Inc.) which consisted essentially of an aqueous solution of about 60% by weight of sodium silicate, and less than 1% by weight of ethylene glycol and sodium methyl silanolate was used as the selective remediation additive and applied at an average rate of 3.5 gallons per cubic yard of soil.

A summary of the results appear in the following table:

TABLE

| SAMPLE | UNTREATED (mg/Kg) | TREATED (mg/Kg) |
| --- | --- | --- |
| No. 1 | 925.0 | <10.0 |
| No. 2 | 1075.0 | <10.0 |
| No. 3 | 1175.0 | <10.0 |
| No. 4 | 725.0 | <10.0 |

The above example demonstrates the effectiveness of the present method in reducing hydrocarbon contaminants in soils to environmentally acceptable levels.

It is contemplated, however, that the method of the present invention may be well suited and adapted to effectively treat soils containing other than hydrocarbon pollutants. For instance, the operative steps of the present method can be applied to the treatment of soils contaminated with various cations of toxic heavy metals, especially lead and mercury; organic and inorganic pesticides, including insecticides; toxic impurities in petroleum-derived herbicides such as dioxin; oily tar residues such as creosotes; and radioactive materials such as radon.

While the invention has been specifically described in its application to the remediation of contaminated soil, it should not be limited solely to such use. The selective additive and treatment method particularly disclosed herein may be used with modifications to treat hydrocarbon contaminated water as well. For instance, both the liquid additive and contaminated water can be intimately blended and aerated using the spray system described above to give similar results. A ratio of 1 gallon of additive per 500 gallons of water is contemplated for this particular application of the present invention. In addition, absorbent pads or absorbent booms treated with the selective additive may be used to perform environmental cleanup of oil spills and oil slicks, for example.

It should be understood that there may be various changes and modifications of the representative embodiments herein chosen for purposes of illustration without departing from the spirit and scope of the invention. Accordingly, the foregoing illustration are not to be interpreted as restrictive of the invention beyond that necessitated by the following claims.

I claim:

1. A method for remediating soils contaminated by hydrocarbon pollutants comprising the steps of:
   (a) collecting the contaminated soil;
   (b) reducing the collected soil to finely-divided particles;
   (c) applying a controlled amount of a selective liquid additive as a spray onto the contaminated soil particles, said liquid additive consisting essentially of an aqueous solution of sodium silicate, ethylene glycol and sodium methyl silanolate; and
   (d) aerating the soil particles as the additive is being applied, whereby the treated soil can be safely discharged into the environment.

2. The method according to claim 1 wherein the contaminated soil particles are reduced to an average particle size of less than about an ⅛ inch in cross-sectional diameter.

3. The method according to claim 1 wherein the liquid additive is applied at an average rate of about 1–8 gallons of said additive per cubic yard of contaminated soil.

4. The method of according to claim 1 wherein the amount of liquid additive applied is controlled by continuously monitoring the pH value of the soil and making adjustments to the application rate of said additive to achieve a neutral pH for the treated soil.

5. The method according to claim 1 wherein the liquid additive is applied by a mechanized spray system which includes a plurality of spray nozzles directed at the contaminated soil particles from many different angles.

6. The method according to claim 1 wherein the liquid additive consists essentially of an aqueous solution of about 50%–70% by weight of sodium silicate, and less than 2% by weight of ethylene glycol and sodium methyl silanolate.

* * * * *